United States Patent
Huang et al.

(10) Patent No.: US 11,391,637 B1
(45) Date of Patent: Jul. 19, 2022

(54) MEMS PRESSURE SENSOR AND PREPARATION METHOD THEREOF

(71) Applicant: SOUTHEAST UNIVERSITY, Nanjing (CN)

(72) Inventors: Xiaodong Huang, Nanjing (CN); Pengfei Zhang, Nanjing (CN); Zhiqiang Zhang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/554,768

(22) Filed: Dec. 17, 2021

(30) Foreign Application Priority Data

Dec. 30, 2020 (CN) .......................... 202011597567.3

(51) Int. Cl.
*G01L 1/18* (2006.01)

(52) U.S. Cl.
CPC ...................... *G01L 1/18* (2013.01)

(58) Field of Classification Search
CPC ........... G01L 1/18; B81B 3/0018; B81B 7/02; B81B 3/0021
USPC .................................................. 73/862.627
See application file for complete search history.

(56) References Cited

U.S. PATENT DOCUMENTS

| 4,080,619 A | * | 3/1978 | Suzuki | H01L 23/3157 257/591 |
| 10,797,681 B1 | * | 10/2020 | Hurwitz | H01L 21/76871 |

FOREIGN PATENT DOCUMENTS

| CN | 106468604 A | | 3/2017 | |
| CN | 107894297 A | | 4/2018 | |
| CN | 109712957 A | * | 5/2019 | ............. H01G 4/012 |
| CN | 111947815 A | | 11/2020 | |
| CN | 214693312 U | * | 11/2021 | ........... B81B 3/0021 |
| CN | 215448264 U | * | 1/2022 | |

* cited by examiner

*Primary Examiner* — Octavia Davis Hollington
(74) *Attorney, Agent, or Firm* — Treasure IP Group, LLC

(57) ABSTRACT

The invention discloses a MEMS pressure sensor, which includes a bulk silicon layer, a buried oxygen layer, a substrate, a varistor, a first passivation layer, an electrode layer, and a second passivation layer. The varistor is located on the upper surface of the buried oxygen layer, and the first passivation layer is a rectangular shell located on the upper surface of the buried oxygen layer; there is a through hole in the center of the top of the rectangular shell; the first passivation layer covers the varistor, and the gap between the first passivation layer and the varistor forms an isolation cavity. The electrode layer is located on the upper surface of the first passivation layer and is connected with the varistor via the through hole. The second passivation layer is located on the upper surface of the electrode layer.

8 Claims, 3 Drawing Sheets

MEMS PRESSURE SENSOR AND PREPARATION METHOD THEREOF

CROSS-REFERENCE TO RELATED APPLICATIONS

This application claims priority to Chinese Patent Application No. 202011597567.3, filed on Dec. 30, 2020, the contents of which is incorporated herein by reference in its entirety.

TECHNICAL FIELD

The invention relates to a MEMS (Micro-Electro-Mechanical System) pressure sensor and a preparation method thereof.

BACKGROUND

Pressure sensors are widely applied in many fields of national economy and people's livelihood, including aerospace, industrial production, agricultural monitoring, environmental monitoring, national defense and military, etc. Compared with a mechanical pressure sensor, a MEMS pressure sensor has the characteristics such as small size, high accuracy, low cost and easy integration, and has developed into an important branch of pressure sensors. The MEMS piezoresistive pressure sensor realizes pressure detection based on the piezoresistive effect, and has the advantages such as simple structure, excellent performance and low price; therefore, the MEMS piezoresistive pressure sensor has been occupying the main share of MEMS pressure sensors. The traditional MEMS piezoresistive pressure sensor usually uses the mode of pn junction isolation between the varistor and the substrate. The pn junction leakage current will rise sharply as the temperature rises, so it is generally difficult to apply the traditional MEMS piezoresistive pressure sensor in high-temperature cases. In this context, a SOI (Silicon On Insulator) MEMS piezoresistive pressure sensor has emerged in recent years. This sensor uses the mode of all-dielectric isolation between the varistor and the substrate; therefore, the sensor has effectively solved the electric leakage problem of the traditional MEMS piezoresistive pressure sensor and is widely applied in high-temperature harsh environments involving aerospace, petrochemical engineering, etc.

The varistor of the existing SOI MEMS piezoresistive pressure sensor is usually tightly wrapped by a passivation layer, and the electrode of the varistor is led out by opening a hole in the passivation layer. On the one hand, the existing passivation layer materials such as silicon dioxide and silicon nitride and the existing preparation processes such as chemical vapor deposition and physical vapor deposition cause a considerable number of defects in the passivation layer, and these defects will capture charges; on the other hand, the SOI MEMS piezoresistive pressure sensor often faces extremely harsh environments, such as high temperature, high humidity, and high radiation environments. These environments cause the charges captured in the passivation layer to drift and then new defects and new charges in the passivation layer extremely easily, which is not conducive to the stable performance of the sensor. In addition, in the above extremely harsh environments, the material property mismatch between the passivation layer and the varistor, such as thermal expansion coefficient mismatch, will also cause damage to the varistor. The above problems lead to the long-term stability problem of the existing SOI MEMS piezoresistive pressure sensor.

SUMMARY OF THE INVENTION

The purpose of the invention: In view of the above-mentioned prior art, the invention proposes a MEMS pressure sensor and a preparation method thereof to effectively solve the long-term stability problem of the existing SOI MEMS piezoresistive pressure sensor.

Technical Scheme: a MEMS pressure sensor includes a bulk silicon layer, a buried oxygen layer, a substrate, a varistor, a first passivation layer, an electrode layer, and a second passivation layer; the bulk silicon layer is located on the upper surface of the substrate, the buried oxygen layer is located on the upper surface of the bulk silicon layer, a cavity is set inside the bulk silicon layer, and the bulk silicon layer directly above the cavity and the buried oxygen layer jointly form a pressure sensitive film; the varistor is located on the upper surface of the buried oxygen layer, and the first passivation layer is a rectangular shell located on the upper surface of the buried oxygen layer; there is a through hole in the center of the top of the rectangular shell; the first passivation layer covers the varistor, and the gap between the first passivation layer and the varistor forms an isolation cavity; the electrode layer is located on the upper surface of the first passivation layer and is connected with the varistor via the through hole; the second passivation layer is located on the upper surface of the electrode layer.

Further, the pressure sensor includes totally four varistors mounted on the upper surface of the buried oxygen layer; the four varistors are respectively mounted at the position directly above the midpoint of the four sides of the cavity, and each varistor is separately provided with the first passivation layer, the electrode layer, and the second passivation layer; the four varistors are connected by a Wheatstone bridge;

Further, the electrode layer completely covers the upper surface of the first passivation layer.

Further, the material and thickness of the first passivation layer are consistent with those of the second passivation layer.

Further, the material of the substrate is single crystal silicon or glass, and the thickness is 200-2000 μm.

Further, the thickness of the pressure sensitive film is 1-50 μm.

Further, the material of the first passivation layer is silicon dioxide or silicon nitride, and the thickness is 1-20 μm.

Further, the material of the first passivation layer is hydrogenated silicon dioxide or hydrogenated silicon nitride.

A method for preparing the MEMS pressure sensor, including the following steps:

Step 1. preparing an SOI wafer, wherein the SOI wafer includes a bulk silicon layer, a buried oxide layer and a device layer;

Step 2. forming the varistor by photoetching and ion implantation on the device layer of the SOI wafer;

Step 3. preparing a sacrificial layer on the upper surface and side wall of the varistor by lift-off and electron beam evaporation;

Step 4. preparing the first passivation layer on the surface of the sacrificial layer by PECVD and photoetching, and forming the through hole in the center of the first passivation layer and the sacrificial layer by photoetching;

Step 5. preparing the electrode layer on the upper surface of the first passivation layer by lift-off and electron beam evaporation, forming a sacrificial layer etch hole in the electrode layer and the first passivation layer by photoetching, and then forming the isolation cavity between the first passivation layer and the varistor by etching the sacrificial layer;

Step 6. depositing and forming the second passivation layer on the upper surface of the electrode layer by PECVD and photoetching, wherein the second passivation layer seals the sacrificial layer etch hole;

Step 7. forming an open cavity by performing photoetching on the lower surface of the bulk silicon layer;

Step 8. preparing a substrate, and bonding the substrate with the bottom of the SOI wafer by anodic bonding, so as to form the cavity and complete the preparation of the MEMS pressure sensor.

Beneficial Effects: Compared with the prior art, the invention has the following advantages:

1. The MEMS pressure sensor of the invention realizes both the basic protection function of the passivation layer to the varistor and the physical isolation between the passivation layer and the varistor, which can effectively suppress the performance drift of the varistor caused by a defect and charge capture in the passivation layer and thus improve the long-term stability of the sensor. The physical isolation between the passivation layer and the varistor can also alleviate the stability problem caused by the material property mismatch between the passivation layer and the varistor, and further improve the long-term stability of the sensor. In addition, the setting of the electrode layer in the MEMS pressure sensor of the invention not only realizes the function of leading out the electrode of the varistor, but also helps to suppress the impact of environmental atmosphere and irradiation on the performance of the varistor and improve the stability of the sensor. Therefore, compared with the prior art, the MEMS pressure sensor of the invention has better long-term stability.

2. The invention is prepared using the MEMS technology, and the sensor has the advantages such as small size, high precision, good consistency, easy batch manufacturing and low cost.

DETAILED DESCRIPTION

Figure 1:
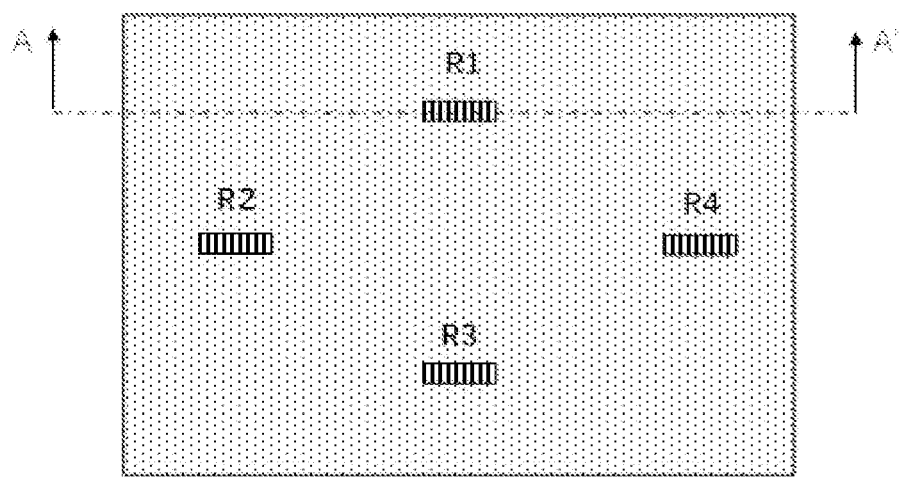
FIG. 1 is a top view schematic of the varistor arrangement in the MEMS pressure sensor of the invention.
Figure 3:
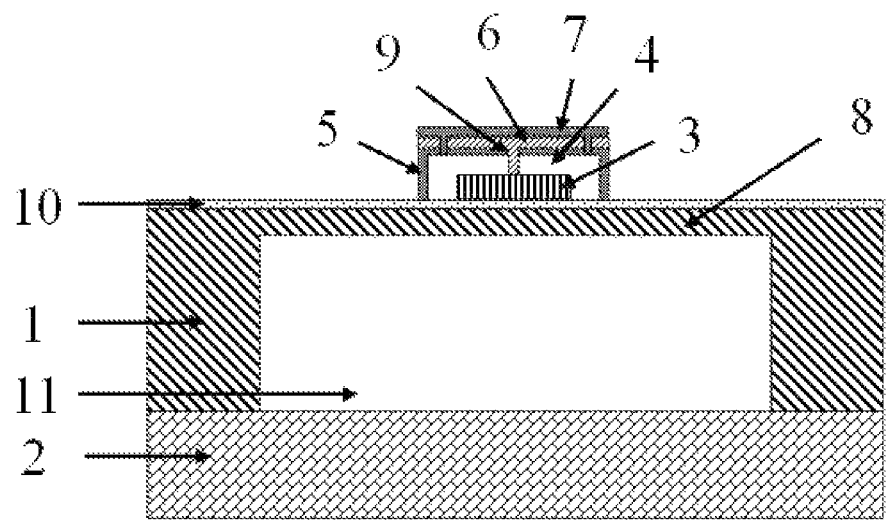
FIG. 3 is a sectional view of the MEMS pressure sensor of the invention along the A-A' direction in FIG. 1.

According to the drawings, the invention is further described as follows:

As shown in FIG. 1 and FIG. 3, a MEMS pressure sensor includes a bulk silicon layer 1, a buried oxygen layer 10, a substrate 2, a varistor 3, a first passivation layer 5, an electrode layer 6, and a second passivation layer 7. The bulk silicon layer 1 is located on the upper surface of the substrate 2, the buried oxygen layer 10 is located on the upper surface of the bulk silicon layer 1, a rectangular cavity 11 is set inside the bulk silicon layer 1, and the bulk silicon layer 1 directly above the cavity 11 and the buried oxygen layer 10 jointly form a pressure sensitive film 8.

Figure 2:
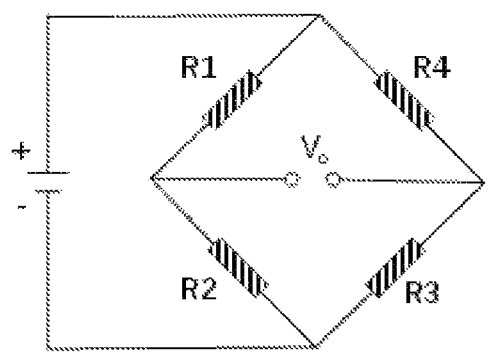
FIG. 2 is a schematic of Wheatstone bridge connection of the varistor in the MEMS pressure sensor of the invention.

The four varistors 3 are located on the upper surface of the buried oxygen layer 10 and are respectively set at the position directly above the midpoint of the four sides of the cavity 11. Each varistor 3 is separately provided with the first passivation layer 5, the electrode layer 6, and the second passivation layer 7. Specifically, the first passivation layer 5 is a rectangular shell located on the upper surface of the buried oxygen layer 10, there is a through hole 9 in the center of the top of the rectangular shell, the first passivation layer 5 covers the varistor 3, and the gap between the first passivation layer 5 and the varistor 3 forms an isolation cavity 4; the electrode layer 6 is located on the upper surface of the first passivation layer 5, and is connected with the varistor 3 through the through hole 9 to lead out the electrode of the varistor 3; the second passivation layer 7 is located on the upper surface of the electrode layer 6. The four varistors (3) are connected by a Wheatstone bridge, as shown in FIG. 2. The electrode layer 6 completely covers the upper surface of the first passivation layer 5.

The material of the substrate 2 is single crystal silicon or glass, and the thickness is 200-2000 μm. The thickness of the pressure sensitive film 8 is 1-50 μm. The material of the first passivation layer 5 is silicon dioxide or silicon nitride, preferably hydrogenated silicon dioxide or hydrogenated silicon nitride; hydrogenation helps reduce and suppress the defect of the film, and the thickness of the layer is 1-20 μm. The material and thickness of the second passivation layer 5 are consistent with those of the first passivation layer 7, which can thus play a role in stress compensation and improve the mechanical strength and reliability of the sensor. The material of the electrode layer 6 is a metal, preferably one of Al, Ti, Au, Cu, and Pt.

The working principle of the MEMS pressure sensor of the present invention is as follows:

The pressure sensitive film 8 is deformed under the action of external pressure, and the deformation of the pressure sensitive film 8 causes the strain of the varistor 3; based on the piezoresistive effect, the resistance of the varistor 3 changes accordingly; the larger the environmental pressure, the larger the deformation of the pressure sensitive film 8, and the larger the corresponding change in the resistance of the varistor 3; the conversion of a pressure signal to an electrical signal is achieved by measuring the resistance change using the Wheatstone bridge.

Figure 4:
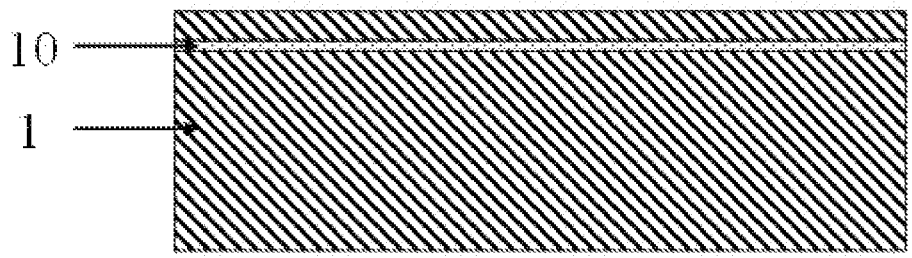
FIG. 4 is a structural representation corresponding to the preparation step 1 of the MEMS pressure sensor of the invention.

A method for preparing the MEMS pressure sensor, including the following steps:

Step 1. preparing an N-type (100) SOI wafer, wherein the buried oxide layer 10 has a thickness of 2 μm, the bulk silicon layer 1 has a thickness of 300 μm, and the device layer has a thickness of 5 μm, as shown in FIG. 4.

Figure 5:
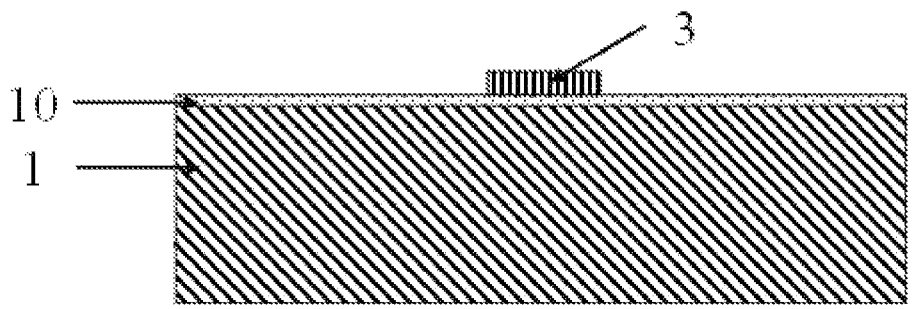
FIG. 5 is a structural representation corresponding to the preparation step 2 of the MEMS pressure sensor of the invention.
Figure 6:
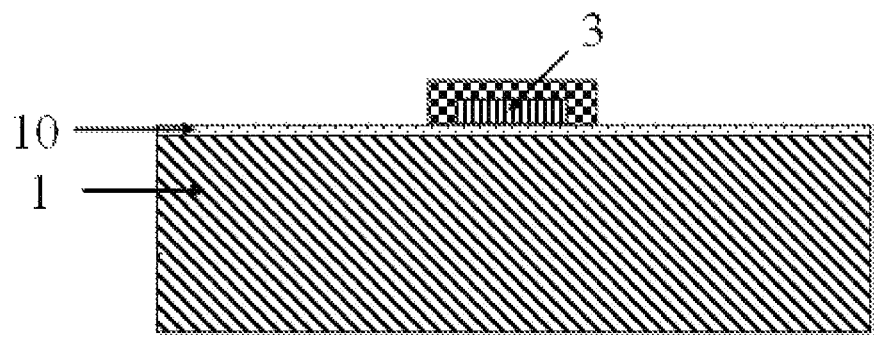
FIG. 6 is a structural representation corresponding to the preparation step 3 of the MEMS pressure sensor of the invention.
Figure 7:
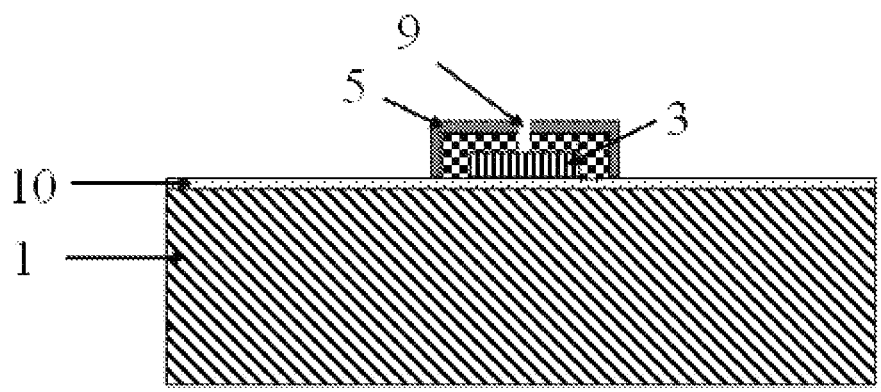
FIG. 7 is a structural representation corresponding to the preparation step 4 of the MEMS pressure sensor of the invention.
Figure 8:
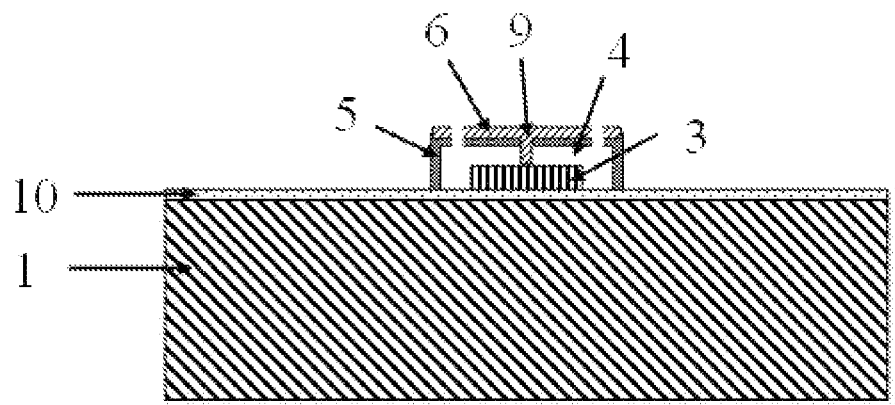
FIG. 8 is a structural representation corresponding to the preparation step 5 of the MEMS pressure sensor of the invention.
Figure 9:
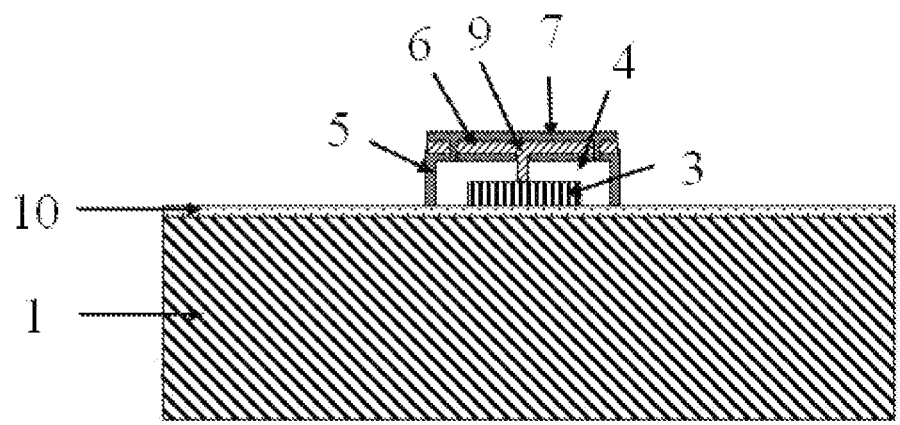
FIG. 9 is a structural representation corresponding to the preparation step 6 of the MEMS pressure sensor of the invention.
Figure 10:
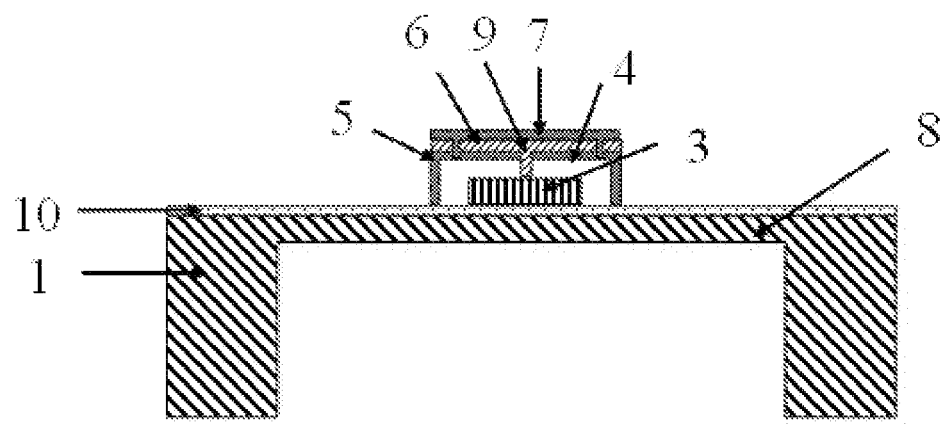
FIG. 10 is a structural representation corresponding to the preparation step 7 of the MEMS pressure sensor of the invention.

Step 2. forming the varistor 3 by photoetching and ion implantation on the device layer of the SOI wafer, as shown in FIG. 5;

Step 3. preparing a 500 nm thick Ti as a sacrificial layer on the upper surface and side wall of the varistor 3 by lift-off and electron beam evaporation, as shown in FIG. 6;

Step 4. preparing a 2 μm thick hydrogenated silicon nitride layer as the first passivation layer 5 on the surface of the sacrificial layer by PECVD and photoetching, and forming the through hole 9 in the center of the first passivation layer 5 and the sacrificial layer by photoetching, as shown in FIG. 7;

Step 5. preparing a 3 μm thick Au as the electrode layer 6 on the upper surface of the first passivation layer 5 by lift-off and electron beam evaporation, forming a sacrificial layer etch hole in the electrode layer 6 and the first passivation layer 5 by photoetching, and then forming the isolation cavity 4 between the first passivation layer 5 and the varistor 3 by etching the sacrificial layer, as shown in FIG. 8;

Step 6. depositing a 2 μm thick hydrogenated silicon nitride layer on the upper surface of the electrode layer 6 by PECVD and photoetching to fill and seal the sacrificial layer etch hole, as shown in FIG. 9;

Step 7. forming an open cavity by performing photoetching on the lower surface of the bulk silicon layer 1, wherein the thickness of the bulk silicon layer on the top of the open cavity is 30 μm, as shown in FIG. 10;

Step 8. preparing a 400 μm thick BF33 glass sheet as the substrate 2, and tightly bonding the substrate 2 with the bottom of the SOI wafer by anodic bonding, so as to form the cavity 11 and complete the preparation of the MEMS pressure sensor, as shown in FIG. 1.

The above description is only a preferred embodiment of the invention. It should be pointed out that as far as a person of ordinary skill in the art is concerned, the person may implement some improvements and modifications on the premise of following the principle of the invention; however, such improvements and modifications shall be deemed to be within the coverage of protection of the invention.

The invention claimed is:

1. A method for preparing a MEMS pressure sensor, comprising
preparing an SOI wafer, wherein the SOI wafer comprises a bulk silicon layer (1), a buried oxide layer (10) and a device layer;
forming a varistor (3) by photoetching and ion implantation on the device layer of the SOI wafer;
preparing a sacrificial layer on an upper surface and side wall of the varistor (3) by lift-off and electron beam evaporation;
preparing a first passivation layer (5) on the surface of the sacrificial layer by plasma enhanced chemical vapor deposition (PECVD) and photoetching, and forming a through hole (9) in a center of the first passivation layer (5) and the sacrificial layer by photoetching;
preparing an electrode layer (6) on the upper surface of the first passivation layer (5) by lift-off and electron beam evaporation, forming a sacrificial layer etch hole in the electrode layer (6) and the first passivation layer (5) by photoetching, and then forming an isolation cavity (4) between the first passivation layer (5) and the varistor (3) by etching the sacrificial layer;
depositing and forming a second passivation layer (7) on an upper surface of the electrode layer (6) by PECVD and photoetching, wherein the second passivation layer (7) seals the sacrificial layer etch hole,
forming an open cavity by performing photoetching on a lower surface of the bulk silicon layer (1); and
preparing a substrate (2), and bonding the substrate (2) with a bottom of the SOI wafer by anodic bonding, so as to form a cavity (11) and complete the preparation of the MEMS pressure sensor;
wherein
the bulk silicon layer (1) is located on an upper surface of the substrate (2), the buried oxygen layer (10) is located on an upper surface of the bulk silicon layer (1), the cavity (11) is set inside the bulk silicon layer (1), and the bulk silicon layer (1), directly above the cavity (11), and the buried oxygen layer (10) jointly form a pressure sensitive film (8);
the varistor (3) is located on an upper surface of the buried oxygen layer (10), and the first passivation layer (5) is a rectangular shell located on the upper surface of the buried oxygen layer (10);
the through hole (9) is in a center of the top of the rectangular shell;
the first passivation layer (5) covers the varistor (3), and a gap between the first passivation layer (5) and the varistor (3) forms the isolation cavity (4);
the electrode layer (6) is located on the upper surface of the first passivation layer (5) and is connected with the varistor (3) via the through hole (9); and
the second passivation layer (7) is located on the upper surface of the electrode layer (6).

2. The method for preparing a MEMS pressure sensor according to claim 1, wherein the pressure sensor comprises a total of four varistors (3) mounted on the upper surface of the buried oxygen layer (10);
the four varistors (3) are respectively mounted at a position directly above a midpoint of four sides of the cavity (11), and each varistor (3) is separately provided with the first passivation layer (5), the electrode layer (6), and the second passivation layer (7); the four varistors (3) are connected by a Wheatstone bridge.

3. The method for preparing a MEMS pressure sensor according to claim 1, wherein the electrode layer (6) completely covers the upper surface of the first passivation layer (5).

4. The method for preparing a MEMS pressure sensor according to claim 1, wherein a material composition and thickness of the first passivation layer (5) are consistent with those of the second passivation layer (7).

5. The method for preparing a MEMS pressure sensor according to claim 1, wherein a material composition of the substrate (2) is a single crystal silicon or glass, and a thickness is 200-2000 μm.

6. The method for preparing a MEMS pressure sensor according to claim 1, wherein a thickness of the pressure sensitive film (8) is 1-50 μm.

7. The method for preparing a MEMS pressure sensor according to claim 1, wherein a material composition of the first passivation layer (5) is silicon dioxide or silicon nitride, and a thickness is 1-20 μm.

8. The method for preparing a MEMS pressure sensor according to claim 7, wherein a material composition of the first passivation layer (5) is hydrogenated silicon dioxide or hydrogenated silicon nitride.

* * * * *